Feb. 3, 1925.
W. E. DUNSTON
1,525,376
BUMPER ATTACHING AND SUPPORTING MEANS
Filed May 8, 1923
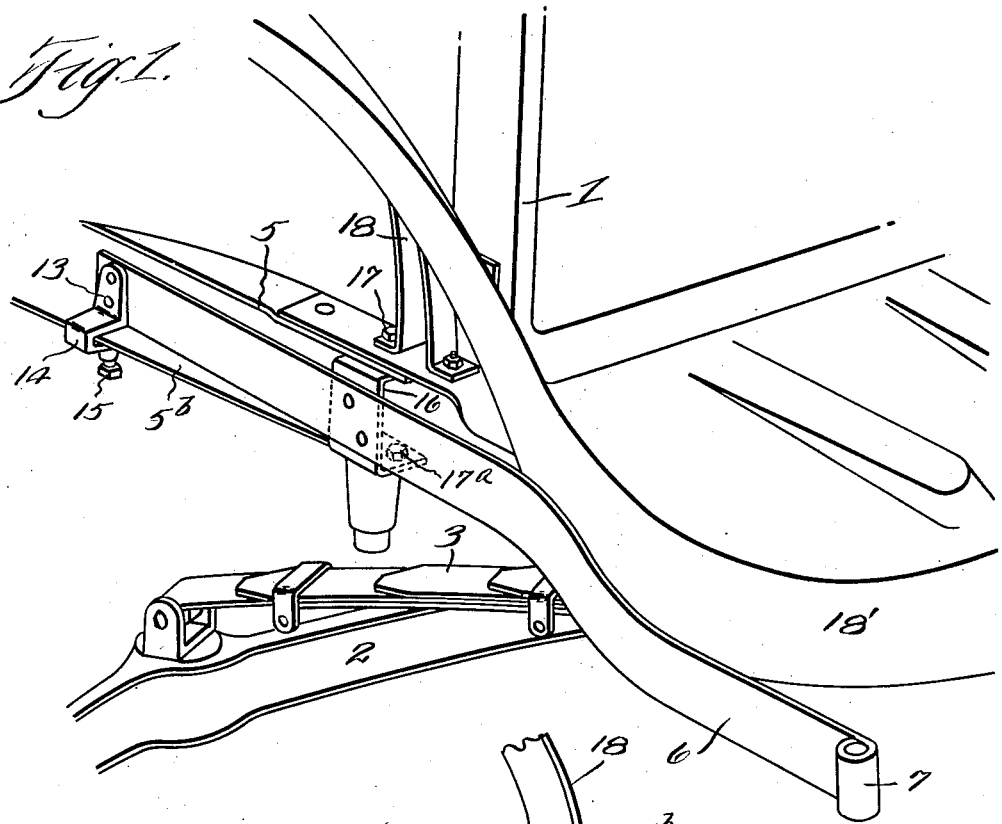
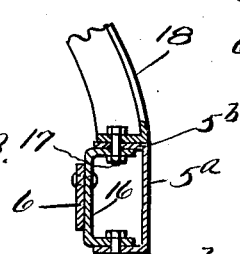
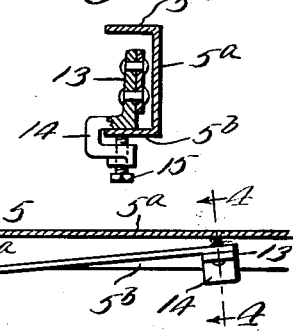
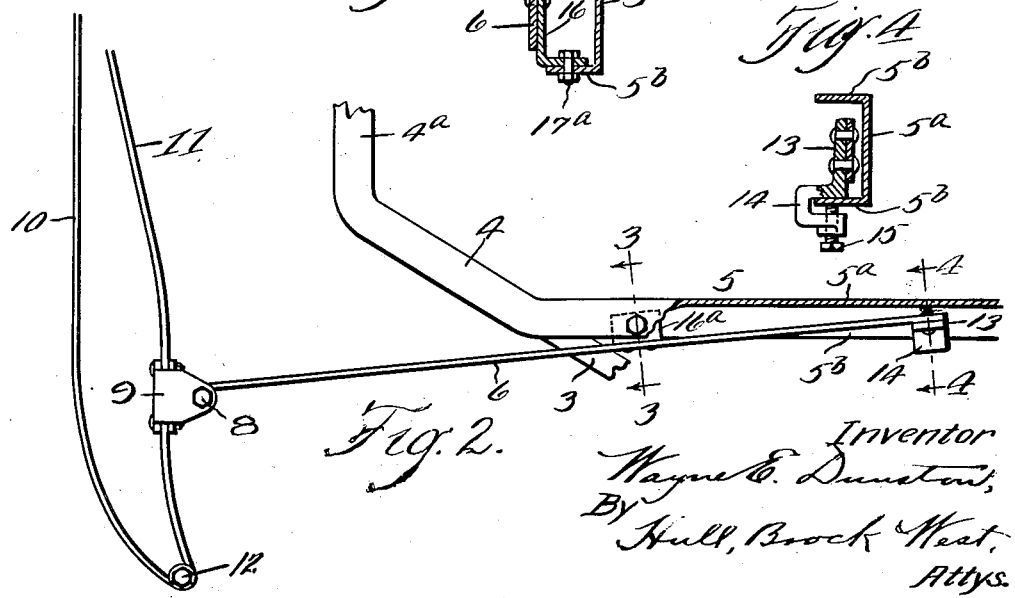

Patented Feb. 3, 1925.

1,525,376

UNITED STATES PATENT OFFICE.

WAYNE E. DUNSTON, OF DETROIT, MICHIGAN, ASSIGNOR TO THE C. G. SPRING & BUMPER COMPANY, OF DETROIT, MICHIGAN, A CORPORATION OF DELAWARE.

BUMPER ATTACHING AND SUPPORTING MEANS.

Application filed May 8, 1923. Serial No. 637,462.

*To all whom it may concern:*

Be it known that I, WAYNE E. DUNSTON, a citizen of the United States, residing at Detroit, in the county of Wayne and State of Michigan, have invented a certain new and useful Improvement in Bumper Attaching and Supporting Means, of which the following is a full, clear, and exact description, reference being had to the accompanying drawings.

This invention relates to means for supporting bumpers from automobile frames, and has for its general object to provide a novel bumper support and means for attaching the same to special types or makes of such frames.

I accomplish the foregoing objects in and through the construction shown in the drawings, wherein Fig. 1 represents a perspective view of the front of one type or make of automobile having my invention applied thereto; Fig. 2 is a detail in plan, showing my invention connected to and supporting a bumper; and Figs. 3 and 4 are sectional details corresponding respectively to the lines 3—3 and 4—4 of Fig. 2.

Describing the parts by reference characters, 1 indicates generally the radiator and 2 the front axle of an automobile wherein the front springs 3 are connected at their rear and outer ends to the front axle, the front and inner ends of the springs being connected to a forwardly and inwardly projected spring hanger 4 carried by and constituting an extension of the front ends of the side frames, one of which is indicated generally at 5. The opposed spring hanger portions of the frame are connected by a transverse front member 4ª.

In the type of automobile indicated herein, each side frame is of the usual channeled shape, but the web 5ª is presented inwardly and the flanges 5ᵇ are presented outwardly, just the reverse of the ordinary arrangement of these members. The spring hanger 4 is carried by and constitutes in effect a forward extension of the side members 5.

In order to support a bumper from the side frames, I provide for each end of the bumper and for each side frame an elongated arm, indicated generally at 6. Each of the two bumper supporting arms is provided with an eye 7 at its front end, which eye is adapted to receive a bolt 8 at the rear end of a clamping member, indicated generally at 9, and which clamping member is secured to the bumper. The bumper indicated herein is one which comprises a front or impact member 10, and a rear or auxiliary member 11, the said members being connected at their ends by means of vertically aligned eyes, and bolts 12.

The rear end of the arm 6 is provided with a clamping bracket, the said bracket comprising a vertical arm 13, shown as riveted to the arm 6, the lower end of the arm 13 being provided with a horizontally-slotted extension 14, which extension is adapted to receive, within the slot thereof, the lower flange 5ᵇ of the corresponding side frame member. A clamping bolt 15, threaded through the lower part of the member 14, serves to fasten the inner or rear end of the arm 6 to the side frame. Riveted to the arm 6, intermediate of the ends thereof, is a channeled clamping member 16, having its flanges projecting inwardly and adapted to engage the bottom and top faces of the top and bottom flanges 5ᵇ respectively. The channel clamp 16 is secured to the top and bottom flanges of the side member by means of bolts 17 and 17ª.

In applying each arm 6 in position, the rear bolt by which the fender bracket 18 is secured to the side frame is removed, the channel clamp 16 is inserted between the top and bottom flanges of the side frame, and the fender bracket bolt (if too short) is replaced by the upper bolt 17 which is furnished with the equipment. The rear end of the arm 6 is swung against the web 5ª of the frame member and the bolt or set screw 15 is tightened, after which both bolts 17, 17ª are tightened, and the bumper arm is secured in place. The parts 4 and 4ª and the front ends of the springs are covered by a sheet metal apron 18'.

By the construction shown and described, I have provided bumper supporting arms which are equipped with means whereby they may be conveniently and efficiently attached to the side frames of automobiles of the type illustrated herein and which, when so applied, will afford a firm support for the bumpers attached to the outer ends thereof.

Having thus described my invention, what I claim is:

1. The combination, with an outwardly-facing channeled side frame, of a bumper supporting arm having at one end an attaching member adapted to be secured to one of the flanges of the said frame and provided with a channeled clamping member adapted to be received between the flanges of the said frame, and means for securing the said channeled clamping member to the flanges of the said frame.

2. The combination, with a channeled side frame, of a bumper supporting arm having an attaching member adapted to be secured to one of the flanges of the said frame and provided with a channeled clamping member adapted to be received between the flanges of the said frame, and means for securing the said channeled clamping member to the flanges of the said frame.

3. The combination, with an outwardly-facing channeled side frame, of a bumper supporting arm having means attached to the rear or inner end thereto and to a part intermediate the ends thereof for securing the said arm to and between the flanges of said frame.

4. The combination, with an outwardly-facing channeled side frame, of a bumper supporting arm having secured thereto a clamping member provided with a slot for the reception of one of the flanges of said side frame, a set screw for securing the said member to the said flange, and additional means, intermediate the ends of said arm, for securing the same to the said frame.

5. The combination, with a channeled side frame, of a bumper supporting arm having secured thereto a clamping member provided with a slot for the reception of one of the flanges of said side frame, a set screw for securing the said member to the said flange, and additional means, intermediate the ends of said arm, for securing the same to the said side frame.

6. The combination, with a channeled side frame, of a bumper supporting arm having a bracket rigid therewith, the said bracket having a slot adapted to receive one of the flanges of the side frame and a set screw adapted to secure the bracket to said bolts for securing the flanges of the last flange, a channel shaped bracket secured to said arm intermediate the ends thereof, and mentioned bracket to the top and bottom flanges of the side frame.

7. A bumper supporting arm having secured thereto a bracket having top and bottom flanges adapted to cooperate with the top and bottom flanges of a side frame and also having secured thereto a bracket having a slot for the reception of one of the flanges of the side frame.

8. A bumper supporting arm having secured thereto a bracket having a flange adapted to cooperate with a flange of a side frame and also having secured thereto a bracket having a slot for the reception of one of the flanges of the side frame.

In testimony whereof, I hereunto affix my signature.

WAYNE E. DUNSTON.